United States Patent
Mankude et al.

(10) Patent No.: US 6,748,437 B1
(45) Date of Patent: Jun. 8, 2004

(54) METHOD FOR CREATING FORWARDING LISTS FOR CLUSTER NETWORKING

(75) Inventors: Hariprasad Mankude, Fremont, CA (US); Sohrab Modi, Oakland, CA (US); Kevin Fox, San Jose, CA (US); Mahalingam Mani, Sunnyvale, CA (US); Sankar Ramamoorthi, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/480,788

(22) Filed: Jan. 10, 2000

(51) Int. Cl.[7] .............................................. G06F 15/16
(52) U.S. Cl. ................... 709/227; 709/105; 709/219; 709/236; 709/238
(58) Field of Search .............................. 709/236, 227, 709/219, 235, 238, 105

(56) References Cited

U.S. PATENT DOCUMENTS

| | | | |
|---|---|---|---|
| 5,774,660 A | 6/1998 | Brendel et al. | 395/200.31 |
| 5,918,017 A | 6/1999 | Attanasio et al. | 395/200.54 |
| 5,964,886 A | 10/1999 | Slaughter et al. | 714/4 |
| 6,097,882 A | 8/2000 | Mogul | 395/200.31 |
| 6,185,619 B1 | 2/2001 | Joffe et al. | 709/229 |
| 6,195,680 B1 | 2/2001 | Goldszmidt et al. | 709/203 |
| 6,226,684 B1 * | 5/2001 | Sung et al. | 709/238 |
| 6,247,141 B1 | 6/2001 | Holmberg | 714/2 |
| 6,256,675 B1 | 7/2001 | Rabinovich | 709/241 |
| 6,363,077 B1 | 3/2002 | Wong et al. | 370/422 |
| 6,424,992 B2 | 7/2002 | Devarakonda et al. | 709/203 |
| 6,438,652 B1 | 8/2002 | Jordan et al. | 711/120 |
| 6,445,709 B1 * | 9/2002 | Chiang | 370/399 |
| 6,470,389 B1 | 10/2002 | Chung et al. | 709/227 |

FOREIGN PATENT DOCUMENTS

WO 98/26559 6/1998 .......... H04L/29/12

* cited by examiner

Primary Examiner—Zarni Maung
Assistant Examiner—Sahera Halim
(74) Attorney, Agent, or Firm—Bever Weaver & Thomas, LLP

(57) ABSTRACT

A scalable cluster system that provides scalable services for client applications is provided with a forwarding list. The scalable services are transparent to the client application. To facilitate this transparent scalability, the system provides a forwarding list. For various operational reasons, such as tuning the system, an operator may change the work distribution weights between nodes of a scalable cluster system. Such a change in work distribution weights may change how packets are assigned to nodes. Forwarding lists are provided so that if the work distribution weights are changed while there are existing connections the forwarding lists allow packets from existing connections to go to the same node as earlier packets from the same connection.

24 Claims, 8 Drawing Sheets

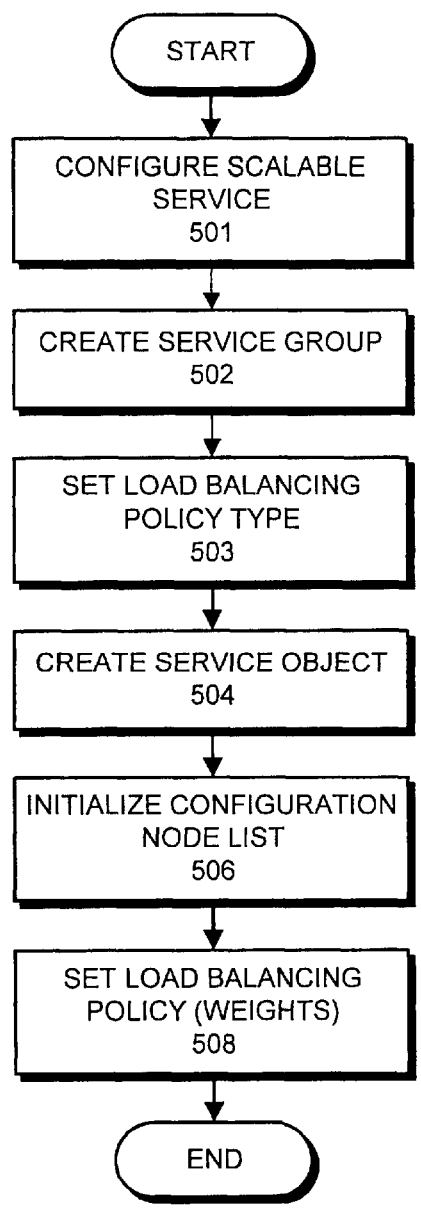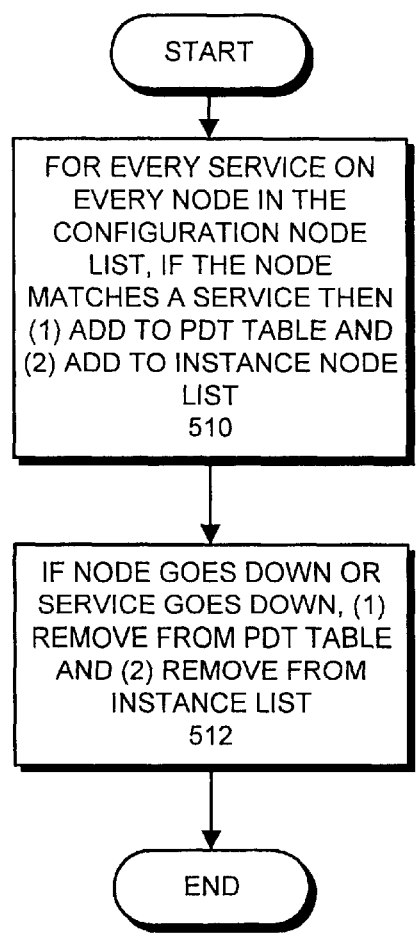
FIG. 5A
FIG. 5B

METHOD FOR CREATING FORWARDING LISTS FOR CLUSTER NETWORKING

RELATED APPLICATIONS

The subject matter of this application is also related to the subject matter in a co-pending non-provisional application filed on the same day as the instant application by inventors Sohrab F. Modi, Sankar Ramamoorthi, Mani Mahalingam, Brian M. Oki, Hariprasad Mankude and Kevin C. Fox entitled "Method And Apparatus For Providing Scalable Services Using A Packet Distribution Table" having a Ser. No. 09/480,147, and filing date Jan. 10, 2000. The subject matter of this application is related to the subject matter in a co-pending non-provisional application filed on the same day as the instant application by inventors Brian M. Oki and Sohrab F. Modi entitled, "Method and Apparatus for Performing a Fast Service Lookup in Cluster Networking," having Ser. No. 09/480,146, and filing date Jan. 10, 2001. The subject matter of this application is also related to the subject matter in a co-pending non-provisional application filed on the same day as the instant application by inventors Hariprasad B. Mankude, and Sohrab F, Modi entitled, "Method and Apparatus for Fast Packet Forwarding in Cluster Networking," having Ser. No. 09/480,145, and filing date Jan. 10, 2000. The subject matter of this application is also related to the subject matter in a co-pending non-provisional application filed on the same day as the instant application by inventors Sohrab F. Modi, Sankar Ramamoorthi, Kevin C. Fox, and Tom Lin entitled "Network Client Affinity For Scalable Services," having a Ser. No. 09/480,280, and filing date Jan. 10, 2000.

BACKGROUND OF THE INVENTION

The present invention relates to clustered computer systems with multiple nodes that provide services in a scalable manner. More specifically, the present invention relates to a method and an apparatus that uses forwarding lists of existing connections to forward packets to server nodes of a cluster.

The recent explosive growth of electronic commerce has led to a proliferation of web sites on the Internet selling products as diverse as toys, books, and automobiles, and providing services, such as insurance and stock trading. Millions of consumers are presently surfing through web sites in order to gather information, to make purchases, or to be entertained.

The increasing traffic on the Internet often places a tremendous load on the servers that host web sites. Some popular web sites receive over a million "hits" per day. In order to process this much traffic without subjecting web surfers to annoying delays in retrieving web pages, it is necessary to distribute the traffic between multiple server nodes, so that the multiple server nodes can operate in parallel to process the traffic.

In designing such a system to distribute traffic between multiple server nodes, a number of characteristics are desirable. It is desirable for such a system to be efficient in order to accommodate as much traffic as possible with a minimal amount of response time. It is desirable for such a system to be "scalable," so that additional server nodes can be added and balancing between the nodes can be modifiable to provide a service as demand for the service increases. In doing so, it is important to ensure that response time does not increase as additional server nodes are added. It is also desirable for such a system to be constantly available, even when individual server nodes or communication pathways between server nodes fail.

A system that distributes traffic between multiple server nodes typically performs a number of tasks. Upon receiving a packet, the system performs a lookup to determine whether the service the packet is meant for is a scalable service.

Once the service is determined as a scalable service, the system distributes workload involved in providing the service between the server nodes that are able to provide the service. What is needed are a method and an apparatus for distributing workload between server nodes that is efficient, scalable, and highly available and allows client affinity.

Once a server node is selected, the packet is forwarded to the server node. The conventional technique of using a remote procedure call (RPC) or an interface definition language (IDL) call to forward a packet typically involves traversing an Internet Protocol (IP) stack from an RPC/IDL endpoint to a transport driver at the sender side, and then traversing another IP stack on the receiver side, from a transport driver to an RPC/IDL endpoint. Note that traversing these two IP stacks is highly inefficient. What is needed are a method and an apparatus for forwarding packets to server nodes that is efficient, scalable, and highly available.

It is desirable to have a scalable service that is transparent to an application. This transparency allows one to write an application that can run on a scalable service or a non-scalable service. Such an application is typically easier to write, since it does not need to take into account scalability. In addition, a scalable service that is transparent to the client application would tend to be able to use existing client applications. Scalable networks when running such applications may run the application on a node of the scalable service. If a series of connections are required between the server and client, one way of doing this is having the nodes in the scalable service have shared memory so that, if the client messages went to different nodes, any node on the system would be able to process the message by accessing the shared memory. The sharing of memory sometimes slows down the system and may be cumbersome. For these reasons, it would be desirable to have all of the packets from one client for one connection go to the same node in a scalable system (client affinity). If the distribution of work between the nodes changes, it would be desirable to have packets of an existing connection to continue to go to the same node until the connection is terminated.

It is desirable to provide the ability to send packets of an existing connection to the same node even when the workload is redistributed on a Solaris™ operating system, which provides clustering and scalable service. Solaris™ is manufactured by Sun Microsystems™ of Palo Alto Calif.

SUMMARY OF THE INVENTION

One embodiment of the present invention provides a system that uses forwarding lists so that if the workload between nodes is redistributed, packets from an existing connection continue to be directed to the same server node until the connection is terminated.

Another embodiment of the present invention provides a method of distributing packets to server nodes in a cluster of nodes, comprising the steps of: receiving a packet at an interface node in the cluster of nodes, the packet including a source address; matching the packet with a service object; performing a function that maps the source address to a bucket of a plurality of buckets in a packet distribution table associated service object matched with the packet, the buckets containing identifiers for server nodes in the cluster of nodes; determining if the source address matches a listing in a forwarding list; if there is a match sending the packet to a node indicated by the match; and, if there is not a match sending the packet to a node identified by the bucket into which the source address of the packet is mapped.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a flow chart illustrating the process of service registration in accordance with an embodiment of the present invention.

FIG. 5B is a flow chart illustrating the process of service activation/deactivation in accordance with an embodiment of the present invention.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), RAM (random access memory) and computer instruction signals embodied in a transmission medium (with or without a carrier wave upon which the signals are modulated). For example, the transmission medium may include a communications network, such as the Internet.

Clustered Computing System

Figure 1:
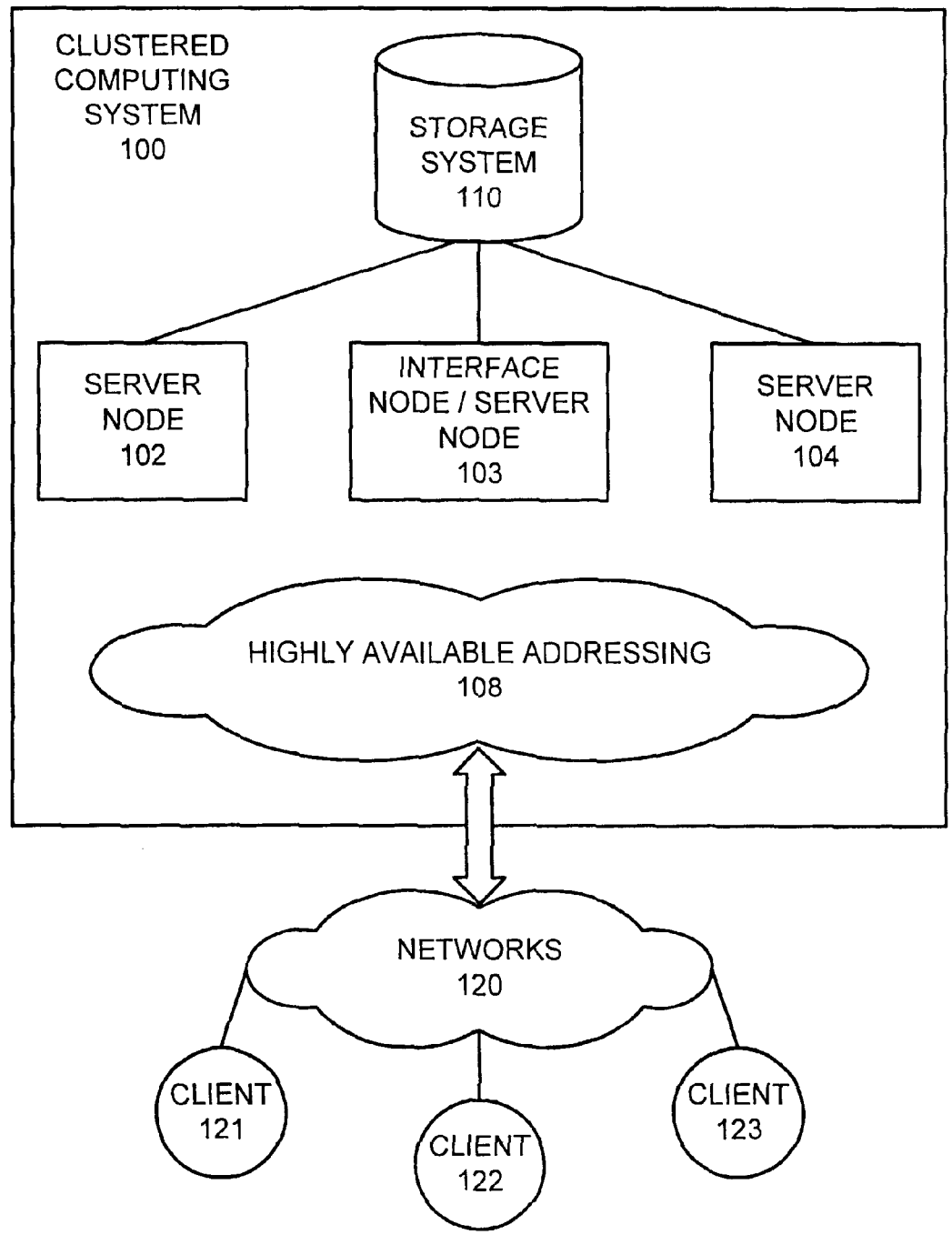
FIG. 1 illustrates a clustered computing system coupled to client computing systems through a network in accordance with an embodiment of the present invention.

FIG. 1 illustrates a clustered computing system 100 coupled to clients 121–123 through networks 120 in accordance with an embodiment of the present invention. Clients 121–123 can include any node on networks 120, including computational capability and including a mechanism for communicating across networks 120. Clients 121–123 communicate with clustered computing system 100 by sending packets to clustered computing system 100 in order to request services from clustered computing system 100.

Networks 120 can include any type of wire or wireless communication channel capable of coupling together computing nodes. This includes, but is not limited to, a local area network, a wide area network, or a combination of networks. In one embodiment of the present invention, networks 120 include the Internet.

Clustered computing system 100 includes a set of nodes that are coupled together through a communication channel (not shown). These nodes include server nodes 102 and 104 as well as interface node/server node 103. Nodes 102–104 are coupled to storage system 110. Storage system 110 provides archival storage for code and/or data that is manipulated by nodes 102–104. This archival storage may include, but is not limited to, magnetic storage, optical storage, flash memory, ROM, EPROM, EEPROM, and battery-backed-up RAM.

Nodes 102–104 are coupled together through a private interconnect with redundant pathways (not shown). For example, nodes 102–104 can be interconnected through a communication mechanism adhering to the Ethernet or a scalable coherent interconnect (SCI) standards. A path manager operates on all of the nodes in clustered computing system 100. This path manager knows about the interconnect topology and monitors the status of pathways. The path manager also provides an interface registry to which other components interested in the status of the interconnect can register. This provides a mechanism for the path manager to make callbacks to the interested components when the status of a path changes, if a new path comes up, or if a path is removed.

Nodes 102–104 are coupled to networks 120 through a highly available addressing system 108. Highly available addressing system 108 allows interface nodes within clustered computing system 100 to be addressed from networks 120 in a "highly-available" manner so that if an interface node fails, a backup secondary interface node is able to take its place without the failure being visible to clients 121–123. Note that interface node 103 can host one or more shared IP addresses for clustered computing system 100. Also note, that more than one node in clustered computing system 100 can act as a standby interface node for a given service. This allows a backup interface node to take over for an interface node that fails.

Note that nodes 102–104 within clustered computing system 100 can provide scalable services. Each scalable service behaves as a single logical entity from the view of clients 121–123. Also note that clients 121–123 can communicate with clustered computing system 100 through a transmission control protocol (TCP) connection or a user datagram protocol (UDP) session.

As load on a service increases, the service attempts to maintain the same per-client response time. A service is said to be "scalable" if increased load on the service is matched with an increase in hardware and server instances that are performing the service or by changing the balancing distribution between nodes. For example, a web server is scalable if additional load on the web server is matched by a corresponding increase in server nodes to process the additional load, or by a change in the distribution of the load across the hardware and server instances that are performing the service.

Clustered computing system 100 operates generally as follows. As packets arrive at interface node 103 from clients 121–123, a service is selected for the packet based on the destination address in the packet. Next, a server instance is selected for the packet based upon the source address of the packet as well as the destination address of the packet. Note that the system ensures that packets belonging to the same TCP connection are sent to the same server instance. Finally, the packet is sent to the selected server instance.

Internal Structure of Interface Nodes and Server Nodes

Figure 2:
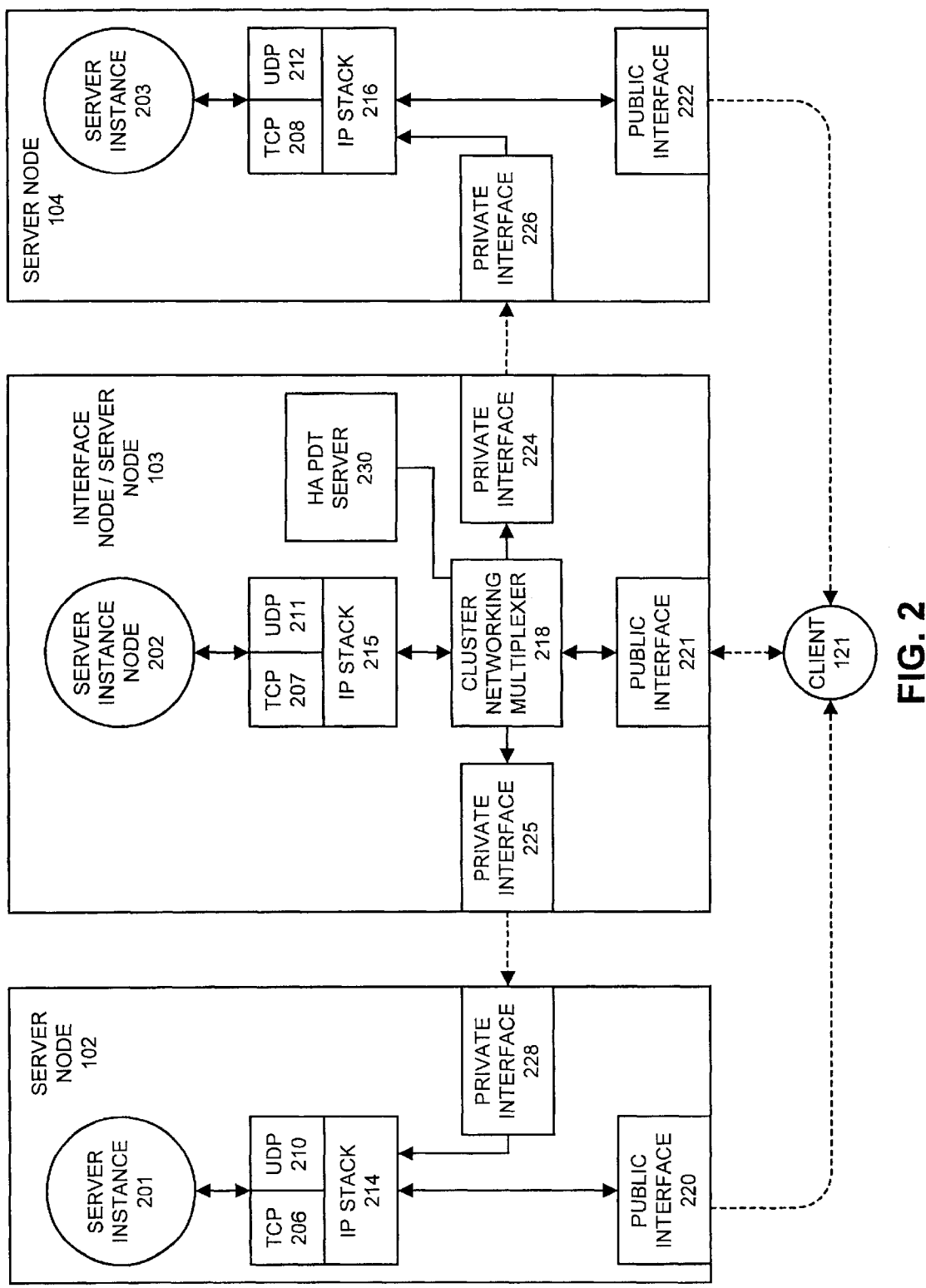
FIG. 2 illustrates the internal structure of an interface node and two server nodes within a clustered computing system in accordance with an embodiment of the present invention.

FIG. 2 illustrates the internal structure of interface node 103 and server nodes 102 and 104 within clustered computing system 100 (FIG. 1) in accordance with an embodiment of the present invention. Client 121 sends packets to clustered computing system 100 in order to receive a service from clustered computing system 100. These packets enter public interface 221 within interface node 103 in clustered computing system 100. Public interface 221 can include any type of interface that is able to receive packets from networks 120.

As packets arrive at interface node 103 via public interface 221, they pass through cluster networking multiplexer 218. Cluster networking multiplexer 218 forwards the packets to various nodes within clustered computing system 100 based upon load balancing policies and other considerations. In making forwarding decisions, cluster networking multiplexer 218 retrieves data from highly available PDT server 230. The structure of this data is described in more detail below with reference to FIG. 3. Note that HA PDT server 230 may be replicated across multiple nodes of clustered computing system 100 so that in case a node fails, a backup node can take over for it to maintain availability for HA PDT server 230.

Packets are forwarded from interface node 103 to other nodes in the clustered computing system 100, including server nodes 102 and 104, through private interfaces 224 and 225. Private interfaces 224 and 225 can include any interface that can handle communications between nodes within clustered computing system 100. For example, packets can be forwarded from private interface 224 to private interface 226 on server node 104, or from private interface 225 to private interface 228 on server node 102. Note that private interfaces 224 and 225 do not handle communications with entities outside of clustered computing system 100.

In some embodiments of the present invention, private interface 224 (and 225) and public interface 221 share some of the same communication hardware and send messages down some of the same physical data paths. In some of these embodiments, private interface 224 and public interface 221 may also share some of the same interface software. Hence, private interface 224 and public interface 221 need not represent different communication mechanisms. Therefore, the distinction between private interface 224 and public interface 221 can be merely a distinction between whether the communications are with an entity outside of clustered computing system 100, or with an entity within clustered computing system 100.

Packets entering server nodes 102 and 104 pass through IP stacks 214 and 216, respectively. Cluster networking multiplexer 218 can also send packets to IP stack 215 within interface node/server node 103, because node 103 is also able to act as a server. On server node 102, packets pass through IP stack 214 into TCP module 206, which supports TCP connections, or into UDP module 210, which supports UDP sessions. Similarly, on interface node/server node 103, packets pass through IP stack 215 into TCP module 207 or into UDP module 211. On server node 104, packets pass through IP stack 216 into TCP module 208 or into UDP module 212. Next, the packets are processed by server instances 201–203 on nodes 102–104, respectively.

Note that return communications for server nodes 102 and 104 do not follow the same path. Return communication from server node 102 pass down through IP stack 214, through public interface 220 and then to client 121. Similarly, return communications from server node 104 pass down through IP stack 216, through public interface 222 and then to client 121. This frees interface node 103 from having to handle return communication traffic.

In web server or other applications, this return communication mechanism can provide load balancing for the return traffic. Note that web servers typically receive navigational commands from a client, and in response send large volumes of web page content (such as graphical images) back to the client. For these applications, it is advantageous to distribute the return traffic over multiple return pathways to handle the large volume of return traffic.

Note that within a server node, such as a proxy node (a non-global interface node for that IP address), such as server node 104, shared IP addresses are hosted on the "loopback interface" of server node 104. (The loopback interface is defined within the UNIX and SOLARIS™ operating system standards. Solaris™ is a trademark of Sun Microsystems, Inc. of Palo Alto, Calif.).

Data Structures to Support Scalable Services

Figure 3:
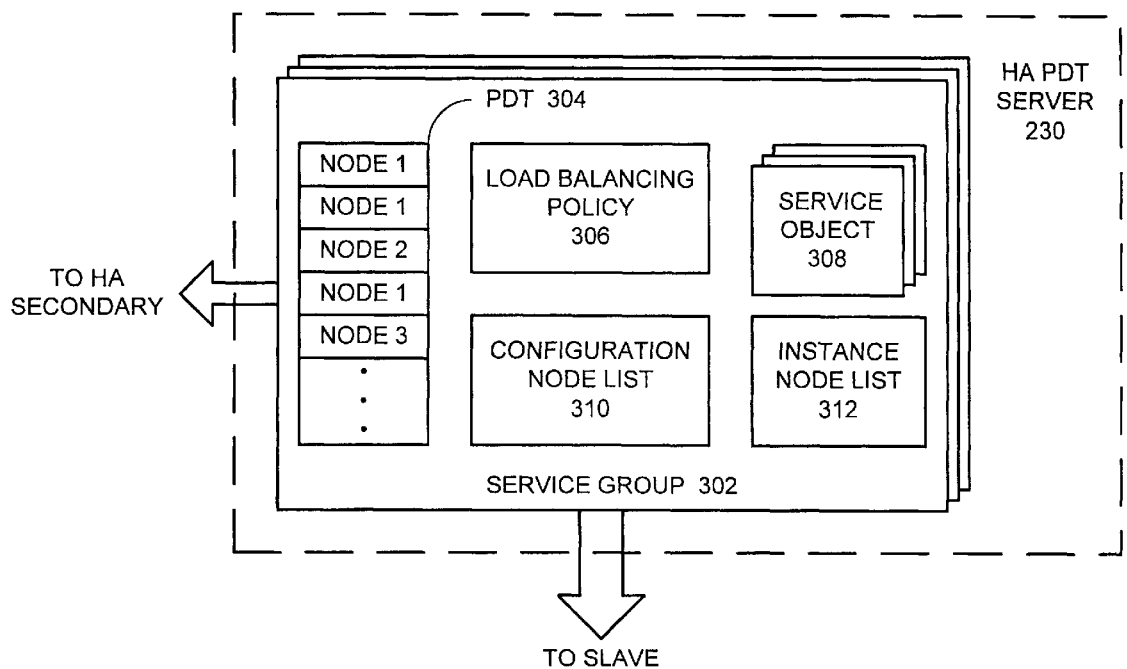
FIG. 3 illustrates data structures associated with a scalable service in accordance with an embodiment of the present invention.

FIG. 3 illustrates data structures associated with a scalable service in accordance with an embodiment of the present invention. HA PDT server 230 contains at least one service group 302. The service group 302 can be associated with a group of service objects (identified by a unique protocol, service IP address, and service port number combination) that share a load balancing policy.

Also note that service group 302 may have at least one associated secondary version on another node and possible spares for fault-tolerance purposes. Any changes to service group 302 may be checkpointed to this secondary version so that if the node containing the primary version of service group 302 fails, the node containing the secondary version can take over.

Service group 302 may be also associated with a number of "slave" versions of the service group located on other nodes in clustered computing system 100. This allows the other nodes to more quickly access the data within service group 302. Any changes to service group 302 may be propagated to the corresponding slave versions. Slave versions may be derivations of the master service group, not having all of the information in the master service group.

Service group 302 includes a number of data structures, including packet distribution table (PDT) 304, load balancing policy 306, a service object 308, configuration node list 310, and instance node list 312.

Configuration node list 310 contains a list of server nodes within clustered computing system 100 that can provide the services associated with service group 302. The service object 308 obtains configuration data from the configuration node list 310. Instance node list 312 contains a list of the nodes that are actually being used to provide these services. The service object 308 contains information related to a service (identified by a unique protocol, service IP address, and service port number combination) associated with the service group 302. There may be more than one service object in each service group. Each service (identified by a unique protocol, service IP address, and service port number combination) associated with the service group is associated with one service object (identified by the same unique protocol, service IP address, and service port number combination as the associated service) in the service group.

Load balancing policy 306 contains a description of a load balancing policy that is used to distribute packets between nodes involved in providing services associated with service group 302. The load balancing policy 306 may specify the load balancing policy type and load balancing policy weights. The described embodiment of the invention uses at least three types of load balancing policies, which include 1) a non-affinity policy, 2) a client affinity policy, and 3) a wild card client affinity policy. There may be various types of non-affinity policies, such as a weighted or round robin load balancing policy. The weights may specify that a certain percentage of traffic is sent to a certain node.

PDT 304 is used to implement the load balancing policy. PDT 304 includes entries that are populated with identifiers for nodes that are presently able to receive packets for the services associated with service group 302. In order to select a server node to forward a packet to, the system hashes the client address and potentially the client port according to the load balancing policy of the PDT 304 as described in more detail below. This hashing selects a particular entry in PDT 304, and this entry identifies a server node within clustered computing system 100.

Note that any random or pseudo-random function can be used to hash the source address.

Also note that the frequency of entries can be varied to achieve different distributions of traffic between different server nodes. For example, a high performance server node that is able to process a large amount of traffic can be given more entries in PDT 304 than a slower server node that is able to process less traffic. In this way, the high-performance server node will, on average, receive more traffic than the slower server node.

Figure 9:
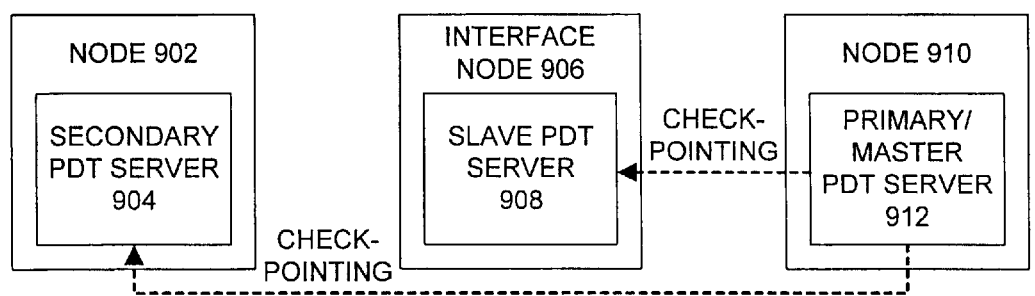
FIG. 9 illustrates how a PDT server is checkpointed to a slave PDT server and a secondary PDT server in accordance with an embodiment of the present invention.

Also note that, if a PDT server fails with configuration data present in its local memory, then a secondary PDT server will take over. The checkpointing process ensures that the configuration data will also be present in the local memory for the secondary PDT server. More specifically, FIG. 9 illustrates how a PDT server is checkpointed to a slave PDT server and a secondary PDT server in accordance with an embodiment of the present invention. As illustrated in FIG. 9, the system maintains a primary/master PDT server 912 on node 910. For high availability purposes, the state of primary/master PDT server 912 is checkpointed to secondary PDT server 904 on node 902 so that secondary PDT server 904 is kept consistent with primary/master PDT server 912. In this way, if primary/master PDT server 912 fails, secondary PDT server 904 is able to take its place.

If primary/master PDT server 912 is not located on an interface node 906, a slave PDT server 908 is maintained on interface node 906 for performance reasons (not high availability reasons). In this case, most of the state of primary/master PDT server 912 is checkpointed to slave PDT server 908 in interface node 906. This allows interface node 906 to access the information related to packet forwarding locally, within slave PDT server 908, without having to communicate with node primary/master PDT server 912 on node 910.

Master service groups are maintained in the primary/master PDT server 912, where the master service groups have master service objects. Secondary copies of the master service groups and master service objects are maintained in the secondary PDT server 904. Slave copies of the master service group, which are subsets or derivations of the master service group, and slave copies of the master service objects, which are subsets or derivations of the master service objects, are maintained in the slave PDT server 908. In the specification, when it is disclosed that data is being read from a service group or written to a service group, it may actually be written to a master, a secondary copy, or slave copy of the master service group. In addition, when it is disclosed that data is being read from a service object or written to a service object, it may actually be written to a master, a secondary copy, or slave copy of the master service object.

Packet Forwarding

Figure 4:
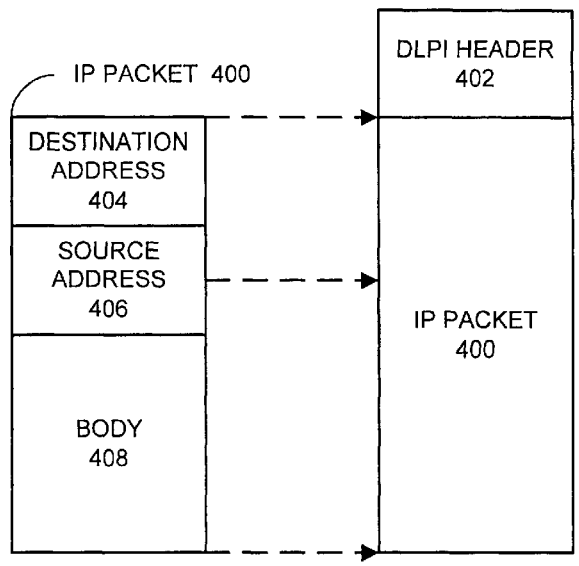
FIG. 4 illustrates how an IP packet is encapsulated with a DLPI header in accordance with an embodiment of the present invention.

FIG. 4 illustrates how an IP packet 400 is encapsulated with a DLPI header 402 in accordance with an embodiment of the present invention. In order for an IP packet 400 to be forwarded between interface node 103 and server node 104 (see FIG. 2), DLPI header 402 is attached to the head of IP packet 400. Note that DLPI header 402 includes the medium access control (MAC) address of the destination server node 104. Also note that IP packet 400 includes a destination address 404 that, in the preferred embodiment, specifies a protocol, a service IP address, and a service port number of a service that is hosted by interface node 103, as well as the source address 406 that, in the preferred embodiment, specifies a client IP address and client port number for a client that sent the packet.

Configuration Process

FIG. 5A is a flow chart illustrating the process of configuring a load balancing system in accordance with an embodiment of the present invention. The system starts by configuring a scalable service group (step 501). This involves creating a service group (step 502) for the scalable service group and specifying a load balancing policy type for the service group (step 503). In the preferred embodiment of the invention, there are at least three types of load balancing policies, which include 1) a non-affinity policy, 2) a client affinity policy, and 3) a wild card client affinity policy. There are various types of non-affinity policies, such as a weighted or round robin load balancing policy. In the preferred embodiment of the invention, load balancing policy weights are initially set at a default of equal weighting for each node. The weights may be set differently later at step 508. A service object is created for a particular service specified by a unique protocol, service IP address and port number (step 504) and is assigned to a service group. The service identified by the service object is placed in either a first service list hash table or a second service list hash table, which lists all services identified by all service objects in all service groups. Services that are identified by service objects in service groups, that do not have wild card client affinity load balancing policy, are placed in the first service list hash table. Services identified by service objects in service groups with a wild card client affinity load balancing policy type are place in the second service list hash table. In addition, services with the same IP service address as a non-scalable service should not be placed in a service group with wild card client affinity. Configuring a scalable service group also involves initializing a configuration node list 310 (step 506) to indicate which server nodes within clustered computing system 100 are able to provide the service group, and setting load balancing policy weights 306 for the service group to change the balance between the nodes from the default setting (step 508). Note that a particular load balancing policy can specify weights for the particular server nodes.

FIG. 5B is a flow chart illustrating the process of service activation/deactivation in accordance with an embodiment of the present invention. This process happens whenever an instance is started or stopped, or whenever a node fails. For every scalable service group, the system examines every node on the configuration node list 310. If the node matches running version of the scalable service group, then the node is added to PDT 304 and to instance node list 312 (step 510).

If at some time in the future a node goes down or the service goes down, a corresponding entry is removed from PDT 304 and instance node list 312 (step 512).

Packet Processing

Figure 6:
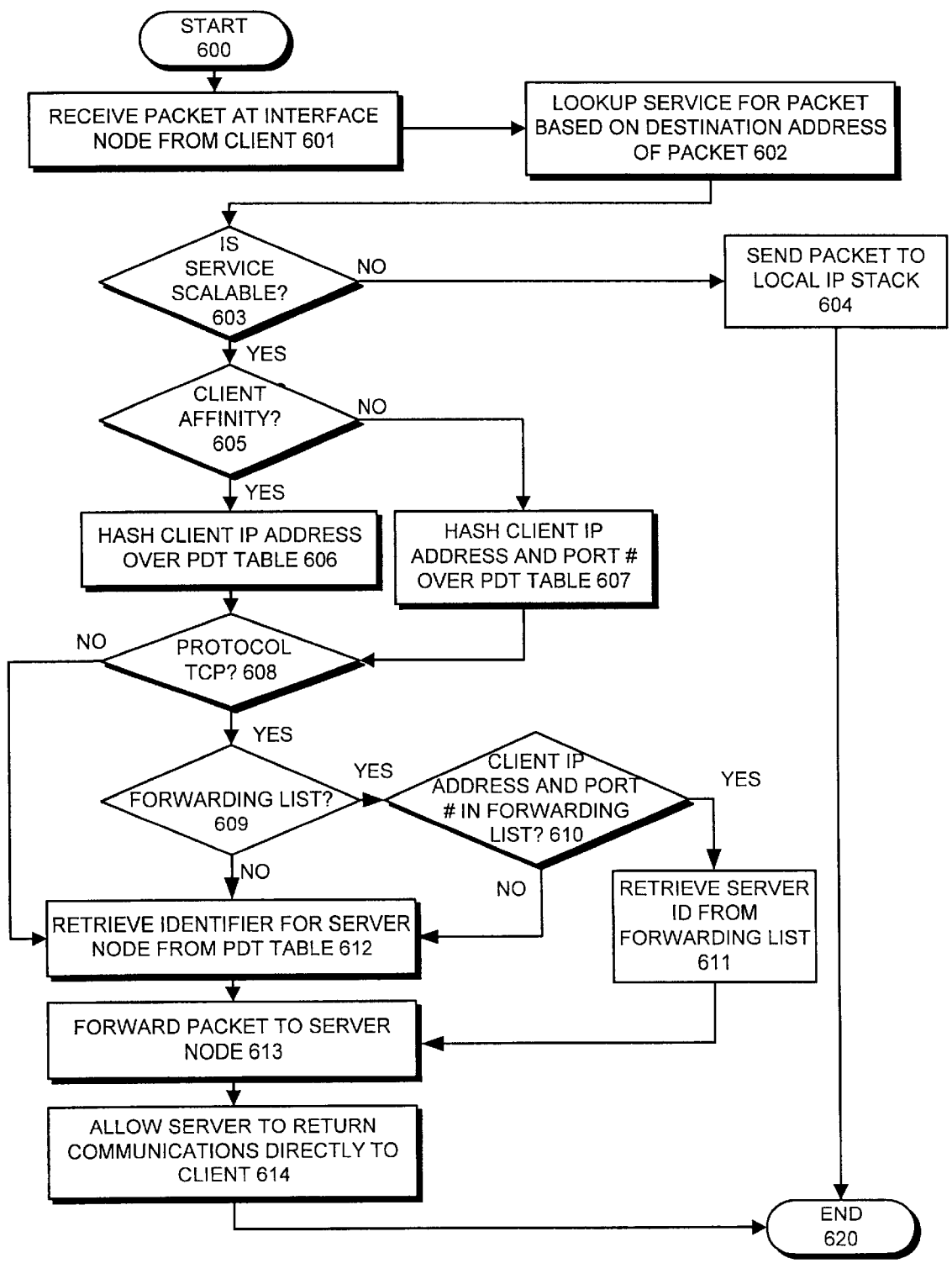
FIG. 6 is a flow chart illustrating how a packet is processed within an interface node in accordance with an embodiment of the present invention.

FIG. 6 is a flow chart illustrating how a packet is processed within an interface node in accordance with an embodiment of the present invention. The system starts by receiving IP packet 400 from client 121 at cluster networking multiplexer 218 within interface node 103 (step 601). IP packet 400 includes a destination address 404 specifying a service, and a client address 406 of the client that sent the packet.

The system first looks up a service for the packet based upon destination address, which in the preferred embodiment is the protocol, service IP address, and service port number, 404 (step 602). This lookup process is described in more detail with reference to FIG. 7 below.

The system next determines if the server is a scalable service (step 603), which is flagged in step 710 of FIG. 7, described in more detail below. If the service is not scalable, the system sends the packet to IP stack 215 within interface node/server node 103, so that server instance 202 can provide the non-scalable service (step 604). Alternatively, interface node 103 can send the packet to a default server node outside of interface node/server node 103 to provide the non-scalable service. For example, server node 104 can be appointed as a default node for non-scalable services. A scalable service is a service that may be served by one or more nodes in a cluster and as a load on the cluster demands. A non-scalable service is a service that is served on only one node.

If the service is a scalable service, the system determines to which server node to send the packet. In doing so, the system first determines whether the service group associated to the service of the packet has a load balancing policy type with client affinity (step 605), i.e., whether the load balancing policy type is client affinity or wild card client affinity. If so, the system hashes the client IP address over PDT 304 to select a bucket from PDT 304 (step 606). If not, the system hashes the client IP address and the port number to select a bucket from the PDT 304 (step 607). It should be noted that when the policy type is a client affinity policy, only the client address is hashed (as opposed to both the client address and port number). This is important in many systems where a single source may have multiple parallel connections with a server that needs to combine the information from the parallel connections (as for example while listening to an internet broadcast, one connection may be used to receive the broadcast and another connection may be used to control the broadcast.) When client affinity is not required, hashing both the client address and client port statistically tends to provide better load balancing.

Next, the system determines whether the protocol is TCP (step 608). If the protocol is not TCP (meaning it is UDP), the system retrieves an identifier for a server node from the entry in the selected bucket of the PDT(step 612). Otherwise, if the protocol is TCP, the system determines whether the selected bucket of the PDT 304 has a forwarding list (step 609). If the selected bucket does not have a forwarding list, the system retrieves the identifier for the server node from the entry in the selected bucket of the PDT 304 (step 612). If the selected bucket has a forwarding list, the system determines if the client IP address and port number are in a forwarding list (step 610). The forwarding list allows existing TCP connections to continue to go to the same node, when the PDT 304 is changed. If so, the system retrieves the server identifier from the forwarding list (step 611). Otherwise, the system retrieves the server identifier from the selected bucket in PDT 304 (step 612). In the preferred embodiment, where the forwarding list and a copy of the PDT is maintained in a service object, only the client IP address and client port of a listing in the forwarding list need to be compared with the client IP address and the client port of the packet to determine if there is a match, since the matching of the packet with the service object has already matched the service IP address and service port.

Next, the system forwards the packet to the server node indicated by the server identifier (step 613). This forwarding process is described in more detail below with reference to FIG. 8.

Interface node 103 then allows the selected server node to send return communications directly back to the client (step 614).

Process of Looking up a Service

Figure 7:
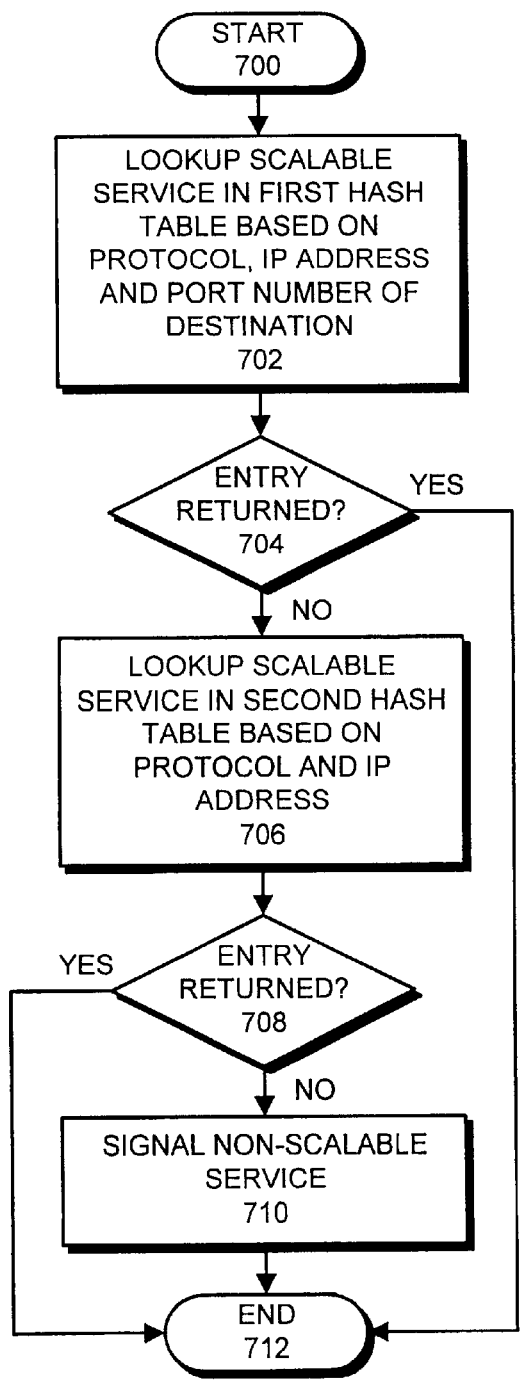
FIG. 7 is a flow chart illustrating the process of looking up a service for a packet in accordance with an embodiment of the present invention.

FIG. 7 is a flow chart illustrating the process of looking up a service for a packet in accordance with an embodiment of the present invention. The system starts by performing a look up based upon the destination address in a first hash table (step 702). In the described embodiment, the look up of the destination address in the first hash table is based on a hash of the protocol, service IP address, and port number of the service. If an entry is returned during this lookup, the associated service, service object, and service group is returned (step 704).

Otherwise, the system looks up a scalable service in a second hash table based upon the destination address (step 706). In this case, only the protocol and the IP address are used to perform the lookup. This is because the second lookup involves a scalable service with a "wild card client affinity" property. Wild card client affinity attempts to ensure that related services are performed on the same server node for the same client for all service ports including unregistered ports. Hence, the second hash table associates related services with the same IP address but with different port numbers with the same server node. This is useful if a node requests that the client "call back" at a dynamically assigned port. The process is complete and the associated service, service object, and service group are returned (step 708).

If no entry is returned in the second lookup, then the service is a non-scalable service and the system signals this fact (step 710), so that step 603 of FIG. 6 sends the packet to a local IP stack (step 604).

In one embodiment of the present invention, the first lookup selects services to be associated with non-affinity and client affinity load balancing policy types and the second lookup selects services to be associated with a wild card client affinity load balancing policy type, although other arrangements are within the scope of the invention.

Process of Forwarding a Packet

Figure 8:
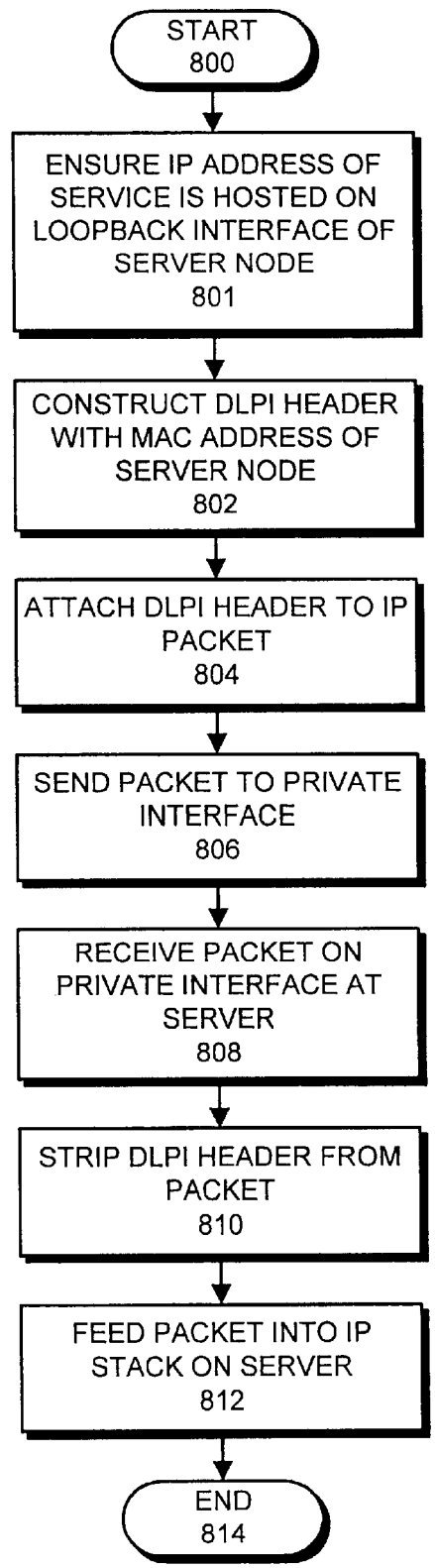
FIG. 8 is a flow chart illustrating the process of forwarding a packet to a server in accordance with an embodiment of the present invention.

FIG. 8 is a flow chart illustrating the process of forwarding a packet to a server in accordance with an embodiment of the present invention. At some time during an initialization process, the system ensures that the IP address of a service is hosted on the loopback interface of each server node that will be used to perform the service (step 801). This allows each server node to process packets for the service, in spite of the fact that the service is not hosted on a public interface of the server node. After an IP packet 400 is received and after a service and a server node are selected (in step 612 of FIG. 6), the system forwards IP packet 400 from cluster networking multiplexer 218 in interface node 103 to IP stack 216 within server node 104. This involves constructing a DLPI header 402, including the MAC address of server node 104 (step 802), and then attaching DLPI header 402 to IP packet 400 (see FIG. 4) (step 804).

Next, the system sends the IP packet 400 with DLPI header 402 to private interface 224 within interface node 103 (step 806). Private interface 224 sends IP packet 400 with DLPI header 402 to server node 104. Server node 104 receives the IP packet 400 with DLPI header 402 at private interface 226 (step 808). Next, a driver within server node 104 strips DLPI header 402 from IP packet 400 (step 810). IP packet 400 is then fed into the bottom of IP stack 216 on server node 104 (step 812). IP packet 400 subsequently passes through IP stack 216 on its way to server instance 203.

Note that the conventional means of using a remote procedure call (RPC) or an interface definition language (IDL) call to forward a packet from interface node 103 to server node 104 involves traversing an IP stack from an RPC/IDL endpoint to private interface 224 within interface node 103, and then traversing another IP stack again at server node 104 from private interface 226 to an RPC/IDL endpoint. This involves two IP stack traversals and is, hence, highly inefficient.

In contrast, the technique outlined in the flowchart of FIG. 8 eliminates the two IP stack traversals.

Also note that, in forwarding the packet to the server node, the system can load balance between multiple redundant paths between the interface node and the server node.

Forwarding List

Figure 10:
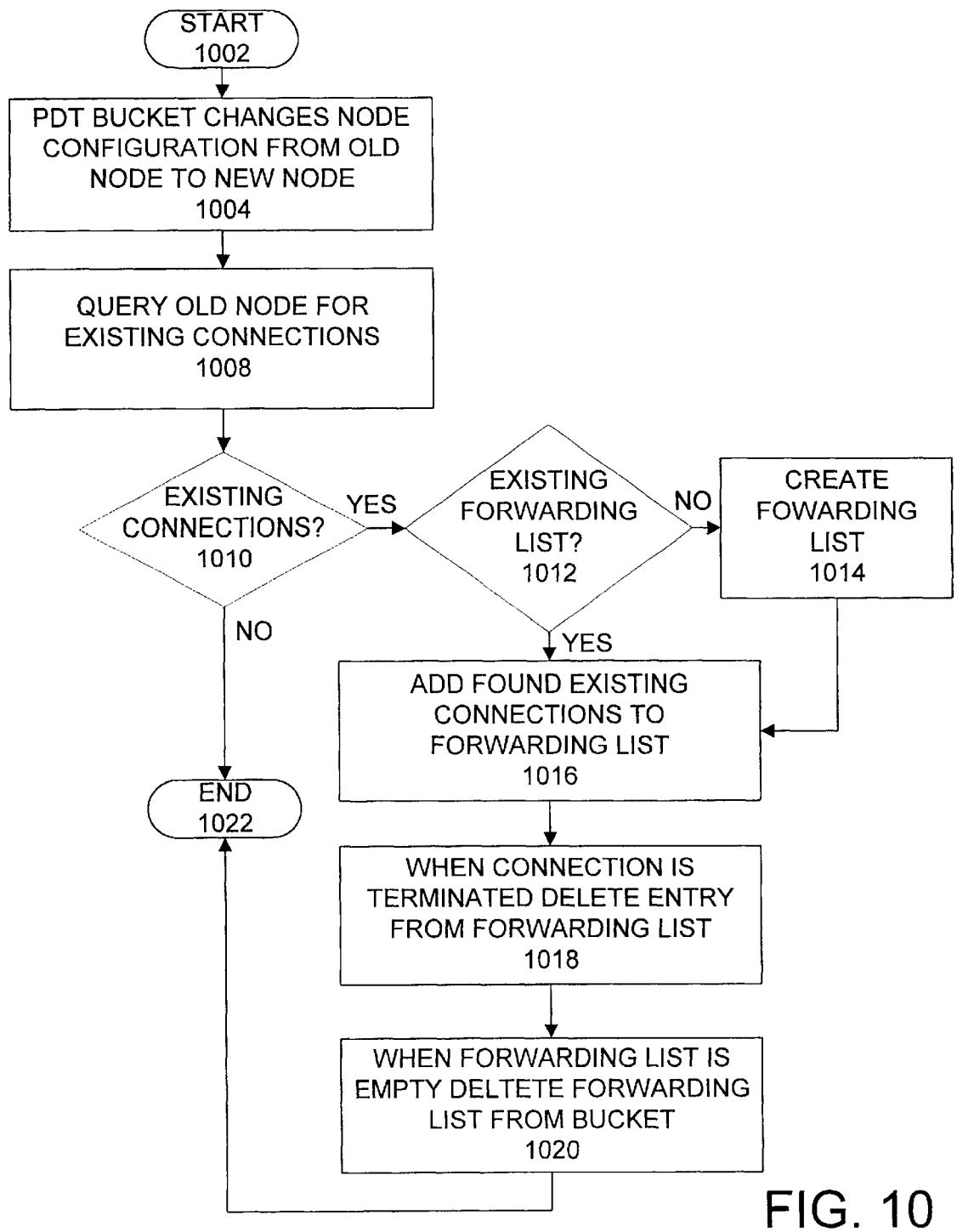
FIG. 10 is a flow chart illustrating the updating of a forwarding list in accordance with an embodiment of the present invention.

FIG. 10 illustrates a method of generating or updating a forwarding list when a server identifier of a bucket in a PDT is changed. Such changes may be made for various reasons. One reason for changing a server identifier is to change the load balancing for a PDT of a service group. An operator may change the load balancing between nodes as a way of tuning the system.

When a server identifier of a bucket of a PDT is changed, a server identifier for an old node is replaced with a server identifier of a new node (step 1004). The interface node 103 checks to see if the old node has any existing TCP connections (steps 1008 and 1010). If there are no existing TCP connections, the process is done (step 1022). If the old node has existing connections, a query is made to see if the bucket has a forwarding list (step 1012). If the bucket does not have a forwarding list, a forwarding list is created (step 1014). Both branches of step 1012 then add the existing TCP connections to the forwarding list (step 1016). In one embodiment, all existing TCP connections for packets with the same service IP address and service port as the PDT are added to the forwarding list. In another embodiment, only those TCP connections with the same service IP address and service port as the PDT and combination source IP address and source port that can be hashed into the bucket are added to the forwarding list, so that only connections corresponding to the bucket are added to the forwarding list. The advantage of placing all connections in the forwarding list is that it saves time required by hashing to see which source IP address and source port corresponds to the bucket. The advantage of only adding connections corresponding to the bucket to the forwarding list is that it keeps the forwarding list size to a minimum.

When an existing TCP connection is terminated, the old node sends a message indicating that the connection has been terminated, and the connection is deleted from the forwarding list (step 1018). When the forwarding list becomes empty the entry for the forwarding list may be removed from the bucket (step 1020).

The use of the forwarding list is described above in steps 608 to 613 of FIG. 6.

EXAMPLE

For example, in the system shown in FIG. 1 and FIG. 2, if the original load balancing weights for a service group was 50% for node 103 and 50% for node 102 and the operator finds that node 103 is over burdened, the operator may change the load balancing weights to 25% for node 103 and 75% for node 102.

A Before PDT for a master service object {TCP, www.sun.com, 80} may be as shown in below:

| Before PDT | | |
|---|---|---|
| Bucket | Node | Forwarding List |
| 1 | 103 | None |
| 2 | 103 | None |
| 3 | 102 | None |
| 4 | 102 | None |

Before the change, a first packet using a typical IP protocol may arrive during a session of a first connection at the interface node 103 (step 1004). The IP packet has a 5 tupple header in the form of {protocol, service IP address, service port, source IP address, source port}. For example, the first packet may have the 5 tupple of {TCP, www.sun.com, 80, ibm.com, 84}. It is found that the service object with the Before PDT matches the packet (step 602). In this example, the load balancing policy type is weighted. Therefore, the source IP address and source port is hashed over the PDT (step 607). There are various ways of hashing the source address and source port of the packet over the PDT. One way is by taking the modulus of the sum of the source address and the source port. In an example of one way of doing this, if ibm.com has an IP address that hashes to 98,942, since there are only four buckets in PDT, then the divisor for the modulus is 4. Therefore, the bucket used is:

(IP source address+source port) Mod number of buckets=(98,942+ 84) Mod 4=2.

Since the packet has a TCP protocol (step 608), the Before PDT is examined to see if bucket 2 has a forwarding list (step 609). Since bucket 2 does not have a forwarding list, the packet is forwarded to the node listed in bucket 2 (steps 612 and 613), which is node 103. So, during this connection, it is desirable to direct all packets in the connection to node 103.

As a result, in the change of the load balancing weights from 50% for node 103 and 50% for node 102 to 25% for node 103 and 75% for node 102, the PDT in the service object changes to the configuration as shown below as After PDT:

The old node (node 103) is queried for any existing connections (step 1008). Since the connection with "ibm.com, 84" still exists (step 1010), bucket 2 is checked to see if bucket 2 has a forwarding list. Since bucket 2 does not have a forwarding list (step 1012), Forwarding List 1 is created (1014) and the existing connections are added to Forwarding List 1 (step 1016) as shown below:

| After PDT | | |
|---|---|---|
| Bucket | Node | Forwarding List |
| 1 | 103 | None |
| 2 | 102 | Forwarding List 1 |
| 3 | 102 | None |
| 4 | 102 | None |

| Forwarding List 1 | |
|---|---|
| Source Address | Old Node |
| ibm.com, 84 | 103 |

In this example, only the source address and port are stored in the forwarding list. In other embodiments, the protocol, service address, and port may also be stored in the forwarding list.

A second packet during the same session and connection as the first packet would have the 5 tupple of {TCP, www.sun.com, 80, ibm.com, 84}. It is found that the same service object, which now has the After PDT, matches the second packet (step 602). In this example, the load balancing policy type is weighted. Therefore, the source IP address and source port is hashed over the PDT (step 607). Therefore, the bucket used is:

(IP source address+source port) Mod number of buckets=(98,942+ 84) Mod 4=2.

Since the packet has a TCP protocol (step 608), the After PDT is examined to see if bucket 2 has a forwarding list (step 609). Since bucket 2 has a forwarding list (Forwarding List 1) (step 609), Forwarding List 1 is searched to see if there are any matches with the source IP address and source port of the second packet (step 610). The only listing in Forwarding List 1 is found to match the second packet, since both reference the source address {ibm.com, 84} and the server ID to old node is retrieved from Forwarding List 1 (step 611). As a result, the interface node forwards the packet to the old node listed in the forwarding list, which is node 103 (step 613). Therefore, even though the load balancing was changed, which changed the PDT, TCP packets of the same connection continued to go to the same node, which avoids the interruption of the connection.

If a second connection is started after the change, while the first connection is continuing from the same client, the client uses another client port for the second connection. A third packet sent as part of this second connection may have a 5 tupple which for example may be {TCP, www.sun.com, 80, ibm.com, 80}. It is found that the service object with the After PDT matches the third packet (step 602). In this example the load balancing policy type is weighted. Therefore, the source IP address and source port is hashed over the PDT (step 607). Therefore, the bucket used is:

(IP source address+source port) Mod number of buckets=(98,942+ 80) Mod 4=2.

Since the third packet has a TCP protocol (step 608), the After PDT is examined to see if bucket 2 has a forwarding list (step 609). Since bucket 2 has a forwarding list (Forwarding List 1) (step 609), Forwarding List 1 is searched to see if there are any matches with the source IP address and source port of the second packet (step 610). Since the third packet has a different source port than the only listing in the forwarding list, no match is found. As a result, the interface node forwards the packet to the new node listed in bucket 2 of the After PDT, which is node 102 (steps 612 and 613). Therefore, new connections, which do not match listings in the forwarding list, are forwarded according to the updated PDT.

After the first connection is terminated, the listing is removed from Forwarding List 1 (step 1018). Since Forwarding List 1 is empty, the Forwarding List 1 is removed from the bucket 2 (step 1020). Since the forwarding list is removed from bucket 2, any packet directed to bucket 2 will be forwarded to node 102.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of distributing packets to server nodes in a cluster of nodes, comprising the steps of:
   receiving a packet at an interface node in the cluster of nodes, the packet including a source address;
   matching the packet with a service object;
   mapping the source address to one bucket of a plurality of buckets in a packet distribution table associated with the service object matched with the packet, the buckets containing identifiers for the server nodes in the cluster of nodes;
   determining if the source address matches a listing in a forwarding list associated with the one bucket to which the source address of the packet is mapped;
   if there is a match with a listing in the forwarding list, sending the packet to a node indicated by the match thereby ensuring that an already established connection is not broken; and
   if there is not a match with a listing in the forwarding list, sending the packet to a node identified by the one bucket to which the source address of the packet is mapped.

2. The method, as recited in claim 1, wherein the step of determining if the source address matches a listing in a forwarding list, comprises the steps of:
   determining if there is a forwarding list entry in the one bucket to which the source address of the packet is mapped;
   if there is no forwarding list entry in the one bucket to which the source address of the packet is mapped then determining there is no match with a listing in a forwarding list; and
   if there is a forwarding list entry in the one bucket to which the source address of the packet is mapped, searching the forwarding list for a match with the source address of the packet.

3. The method, as recited in claim 2, further comprising the steps of:
   updating a bucket in the packet distribution table of the service object by changing the identifier in the bucket from an old node to a new node; and
   updating a forwarding list associated with the updated bucket.

4. The method, as recited in claim 3, wherein the step of updating the forwarding list comprises the steps of:

querying the old node for existing connections; and adding the existing connections of the old node as entries to the forwarding list.

5. The method, as recited in claim 4, wherein the service object has a service associated with the service object and wherein the existing connections have packets with a common destination address and source address, and wherein the step of adding the existing connections of the old node to the forwarding list, comprises the steps of:

searching the existing connections of the old node for existing connections with destination addresses which match the service of the service object; and adding found existing connections of the old node with a destination address, which matches the service of the service object to the forwarding list.

6. The method, as recited in claim 5, further comprising the step of deleting from the forwarding list a listing of a connection of the existing connections that has been terminated.

7. The method, as recited in claim 6, further comprising the steps of:

checking the protocol of the packet; and sending the packet to the node identified by the bucket if the protocol is not TCP, wherein the checking the protocol step and the sending the packet step occurs before the determining if the source address matches a listing step.

8. The method, as recited in claim 7, wherein the source address comprises a client IP address and a client port address.

9. The method, as recited in claim 4, wherein the service object has a service associated with the service object and wherein the existing connections have packets with a common destination address and source address, and wherein the step of adding the existing connections of the old node to the forwarding list, comprises the steps of:

searching the existing connections of the old node for connections with destination addresses which match the service of the service object; and adding the existing connections of the old node with a destination address, which matches the service of the service object, and with a source address, which maps to the bucket of the forwarding list to the forwarding list.

10. The method, as recited in claim 9, further comprising the step of deleting from the forwarding list a listing of a connection of the existing connections that has been terminated.

11. The method, as recited in claim 10, further comprising the steps of:

checking the protocol of the packet; and sending the packet to the node identified by the bucket if the protocol is not TCP, wherein the checking the protocol step and the sending the packet step occurs before the determining if the source address matches a listing step.

12. The method, as recited in claim 11, wherein the source address comprises a client IP address and a client port address.

13. The method as recited in claim 1, wherein the mapping of the source address to the one bucket comprises hashing the source address, wherein the one bucket corresponds to the hashed source address.

14. The method, as recited in claim 1, further comprising:

receiving a second packet at the interface node, matching the second packet with a second service object; and mapping a source address of the second packet to a second bucket of a second plurality of buckets in a second packet distribution table associated with the second service object matched with the packet, the second bucket containing an identifier for one of the server nodes of the cluster of nodes.

15. A computer readable storage medium storing instructions that when executed by a computer causes the computer to perform a method of distributing packets to server nodes in a cluster of nodes, comprising the steps of:

receiving a packet at an interface node in the cluster of nodes, the packet including a source address;

matching the packet with a service object;

mapping the source address to one bucket of a plurality of buckets in a packet distribution table associated with the service object matched with the packet, the buckets containing identifiers for the server nodes in the cluster of nodes;

determining if the source address matches a listing in a forwarding list associated with the one bucket to which the source address of the packet is mapped;

if there is a match with a listing in the forwarding list, sending the packet to a node indicated by the match; and if there is not a match with a listing in the forwarding list, sending the packet to a node identified by the bucket to which the source address of the packet is mapped.

16. The computer readable storage medium, as recited in claim 15, wherein the step of determining if the source address matches a listing in a forwarding list, comprises the steps of:

determining if there is a forwarding list entry in the one bucket to which the source address of the packet is mapped;

if there is no forwarding list entry in the one bucket to which the source address of the packet is mapped then determining there is no match with a listing in a forwarding list; and if there is a forwarding list entry in the one bucket to which the source address of the packet is mapped, searching the forwarding list for a match with the source address of the packet.

17. The computer readable storage medium, as recited in claim 16, further comprising the steps of:

updating a bucket in the packet distribution table of the service object by changing the identifier in the bucket from an old node to a new node; and updating a forwarding list associated with the updated bucket, wherein the step of updating the forwarding list comprises the steps of:

querying the old node for existing connections; and adding existing connections of the old node as entries to the forwarding list.

18. The computer readable storage medium, as recited in claim 17, wherein the service object has a service associated with the service object and wherein the existing connections have packets with a common destination address and source address, and wherein the step of adding the existing connections of the old node to the forwarding list, comprises the steps of:

searching the existing connections of the old node for existing connections with destination addresses, which match the service of the service object;

adding found existing connections of the old node with a destination address which matches the service of the service object to the forwarding list; and further comprising the steps of:

deleting from the forwarding list a listing of a connection of the existing connections that has been terminated;

checking the protocol of the packet; and sending the packet to the node identified by the bucket if the protocol is not TCP, wherein the checking the protocol step and the sending the packet step occurs before the determining if the source address matches a listing step.

19. The computer readable storage medium, as recited in claim, 17, wherein the service object has a service associated with the service object and wherein the existing connections have packets with a common destination address and source address, and wherein the step of adding the existing connections of the old node to the forwarding list, comprises the steps of:

searching the existing connections of the old node for connections with destination addresses, which match the service of the service object;

adding the existing connections of the old node with a destination address which matches the service of the service object and with a source address which maps to the bucket of the forwarding list to the forwarding list; and further comprising the steps of:

deleting from the forwarding list a listing of a connection of the existing connection that has been terminated;

checking the protocol of the packet; and sending the packet to the node identified by the bucket if the protocol is not TCP, wherein the checking the protocol step and the sending the packet step occurs before the determining if the source address matches a listing step.

20. An apparatus for distributing packets to server nodes in a cluster of nodes, wherein one of the server nodes is an interface node, comprising:

a receiving mechanism in the interface node that is configured to receive a packet at the interface node in the cluster of nodes, the packet including a source address;

a service object matching mechanism in the interface node that is configured to match the packet with a service object;

a mapping mechanism in the interface node that is configured to map the source address to one bucket of a plurality of buckets in a packet distribution table associated with the service object matched with the packet, the buckets containing identifiers for the server nodes in the cluster of nodes;

a determining mechanism in the interface node that is configured to determine if the source address matches a listing in a forwarding list associated with the one bucket to which the source address of the packet is mapped;

a match sending mechanism in the interface node that is configured to send the packet to a node indicated by the match, if there is a match with a listing in the forwarding list;

a non-match sending mechanism in the interface node that is configured to send the packet to a node identified by the one bucket to which the source address of the packet is mapped.

21. The apparatus, as recited in claim 20, wherein the determining mechanism, comprises:

a forwarding list determining mechanism that is configure to determine if there is a forwarding list entry in the one bucket to which the source address of the packet is mapped;

a no match indicating mechanism that is configure to determine there is no match with a listing in a forwarding list, if there is no forwarding list entry in the one bucket to which the source address of the packet is mapped; and a forwarding list searching mechanism that is configured to search the forwarding list for a match with the source address of the packet, if there is a forwarding list entry in the one bucket to which the source address of the packet is mapped.

22. The apparatus, as recited in claim 21, further comprising:

a bucket updating mechanism that is configured to update a bucket in the packet distribution table of the service object by changing the identifier in the bucket from an old node to a new node; and a forwarding list updating mechanism that is configured to update a forwarding list associated with the updated bucket, wherein the forwarding list updating mechanism, comprises:

a querying mechanism that is configured to query the old node for existing connections; and an adding mechanism that is configured to add existing connections of the old node as entries to the forwarding list.

23. The apparatus, as recited in claim 22, wherein the service object has a service associated with the service object and wherein the existing connections have packets with a common destination address and source address, and wherein the adding mechanism, comprises:

a searching mechanism that is configured to search the old node for existing connections with destination addresses which match the service of the service object;

a found existing connections adding mechanism that is configured to add found existing connections of the old node with a destination address which matches the service of the service object to the forwarding list; and the apparatus further comprising:

a deleting mechanism that is configured to delete from the forwarding list a listing of a connection of the existing connections that has been terminated;

a protocol checking mechanism that is configured to check the protocol of the packet; and a non-TCP sending mechanism that is configured to send the packet to the node identified by the bucket if the protocol is not TCP.

24. The apparatus, as recited in claim 22, wherein the service object has a service associated with the service object and wherein the existing connections have packets with a common destination address and source address, and wherein the adding mechanism, comprises:

a searching mechanism that is configured to search existing connections of the old node with destination addresses, which match the service of the service, object;

a found existing connections adding mechanism that is configured to add the existing connections of the old node with a destination address which matches the service of the service object and with a source address which maps to the bucket of the forwarding list to the forwarding list; and the apparatus further comprising:

a deleting mechanism for deleting from the forwarding list a listing of a connection of the existing connection that has been terminated;

a protocol checking mechanism that is configured to check the protocol of the packet; and a non-TCP sending mechanism that is configured to send the packet to the node identified by the bucket if the protocol is not TCP.

* * * * *